United States Patent
Horner et al.

(10) Patent No.: US 9,475,584 B2
(45) Date of Patent: Oct. 25, 2016

(54) CABIN PRESSURE CONTROL SYSTEM THRUST RECOVERY OUTFLOW VALVE AND METHOD THAT ENABLE RAM AIR RECOVERY

(75) Inventors: Darrell Horner, Oro Valley, AZ (US); Eric Thomas Jeffers, Mesa, AZ (US); Robert Ryan Lunderville, Maricopa, AZ (US); Mark William Mundell, Mesa, AZ (US); John Nathan Bowler, Phoenix, AZ (US); Derek Schell, Queen Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 650 days.

(21) Appl. No.: 13/224,890

(22) Filed: Sep. 2, 2011

(65) Prior Publication Data

US 2013/0059516 A1     Mar. 7, 2013

(51) Int. Cl.
*B64D 13/02*     (2006.01)

(52) U.S. Cl.
CPC ..................... *B64D 13/02* (2013.01)

(58) Field of Classification Search
CPC .............. B64D 13/02; B64D 13/04; B64D 2013/0603; B64D 2013/0618; B64D 13/00; B64D 13/06; B64D 2013/003; F16K 17/168; F16K 17/0446; F16K 31/465; F16K 1/18; B60H 1/248; B60H 1/249; B60H 1/24; B60H 1/26; B60H 1/3442
USPC ............ 454/70–76; 251/298, 343; 244/129.4
See application file for complete search history.

(56) References Cited

U.S. PATENT DOCUMENTS

| | | | | |
|---|---|---|---|---|
| 3,315,413 A * | 4/1967 | Beecher et al. | ................. | 49/280 |
| 3,327,732 A * | 6/1967 | Deve | ....................... | F16K 15/03 |
| | | | | 137/527.8 |
| 3,426,984 A * | 2/1969 | Emmons | ................... | 244/117 R |
| 3,544,045 A * | 12/1970 | Butscher | ................... | 244/129.1 |
| 3,718,171 A * | 2/1973 | Godwin | ....................... | 160/210 |
| 4,960,249 A * | 10/1990 | Signoret et al. | ........... | 244/118.5 |
| 5,046,686 A * | 9/1991 | Carla et al. | ................ | 244/118.5 |
| 5,105,729 A * | 4/1992 | Signoret et al. | ................ | 454/74 |

(Continued)

FOREIGN PATENT DOCUMENTS

| | | |
|---|---|---|
| EP | 2428446 A2 | 3/2012 |
| WO | 2012019796 A1 | 2/2012 |

OTHER PUBLICATIONS

EP Search Report, EP 12182276.1-2422 dated Dec. 21, 2012.

(Continued)

*Primary Examiner* — Steven B McAllister
*Assistant Examiner* — Ko-Wei Lin
(74) *Attorney, Agent, or Firm* — Lorenz & Kopf, LLP (57) ABSTRACT

A thrust recovery outflow valve and method for controlling the transfer of air between a cabin in an aircraft and atmosphere outside of the aircraft are provided. An outflow valve is mounted on the aircraft that includes a valve frame, a first valve door, and a second valve door. The first valve door is rotated to a first predetermined open position while the second valve door is in the second door closed position to thereby open first and second flow passages that place the aircraft cabin in fluid communication with the atmosphere. When the first valve door is at a first predetermined open position, a flap is rotated, relative to the first valve door, to at least partially cover the second flow passage and thereby at least inhibit flow through the second flow passage.

13 Claims, 12 Drawing Sheets

(56) References Cited

U.S. PATENT DOCUMENTS

| | | | |
|---|---|---|---|
| 6,128,896 A | 10/2000 | Saiz | |
| 6,273,136 B1* | 8/2001 | Steinert et al. | 137/630 |
| 6,619,591 B2* | 9/2003 | Erben et al. | 244/129.5 |
| 6,634,597 B2 | 10/2003 | Johnson et al. | |
| 6,783,114 B2* | 8/2004 | Sandhu et al. | 251/294 |
| 7,185,853 B2* | 3/2007 | Kelnhofer et al. | 244/129.5 |
| 7,198,062 B2* | 4/2007 | Hoffman et al. | 137/601.09 |
| 7,849,702 B2 | 12/2010 | Parikh | |
| 8,342,920 B2* | 1/2013 | Tanner et al. | 454/71 |
| 8,376,818 B2* | 2/2013 | Horner | 454/71 |
| 8,439,061 B2* | 5/2013 | Baumann | 137/15.1 |
| 2005/0151016 A1* | 7/2005 | Kelnhofer et al. | 244/129.1 |
| 2007/0245711 A1* | 10/2007 | Stretton | 60/226.1 |
| 2008/0197236 A1* | 8/2008 | Horner et al. | 244/129.1 |
| 2008/0314060 A1* | 12/2008 | Parikh | 62/241 |
| 2010/0001127 A1 | 1/2010 | Petrac | |
| 2010/0096503 A1* | 4/2010 | Tanner | B64D 13/02 244/129.4 |
| 2010/0190428 A1* | 7/2010 | Horner | 454/74 |
| 2010/0216385 A1 | 8/2010 | Heuer | |
| 2010/0240291 A1 | 9/2010 | Tanner et al. | |
| 2010/0247297 A1* | 9/2010 | Legare et al. | 415/173.1 |
| 2011/0165828 A1* | 7/2011 | Horner et al. | 454/74 |
| 2011/0177770 A1* | 7/2011 | Tanner et al. | 454/74 |
| 2013/0210330 A1* | 8/2013 | Steinert et al. | 454/73 |

OTHER PUBLICATIONS

EP Communication, EP 12182276.1-2422 dated Nov. 1, 2013.

* cited by examiner

CABIN PRESSURE CONTROL SYSTEM THRUST RECOVERY OUTFLOW VALVE AND METHOD THAT ENABLE RAM AIR RECOVERY

TECHNICAL FIELD

The present invention generally relates to aircraft cabin pressure thrust recovery systems, and more particularly relates to a cabin pressure control system thrust recovery outflow valve and method that enable ram air recovery.

BACKGROUND

Aircraft are commonly equipped with Cabin Pressure Control Systems (CPCSs), which maintain cabin air pressure within a desired range to increase passenger comfort during flight. A typical CPCS may include a controller, an actuator, and an outflow valve. The outflow valve is typically mounted either on a bulkhead of the aircraft or on the outer skin surface of the aircraft, and selectively fluidly couples the aircraft cabin and the atmosphere outside of the aircraft. During operation, the controller commands the actuator to move the outflow valve to various positions to control the rate at which pressurized air is transferred between the aircraft cabin and the outside atmosphere, to thereby control the pressure and/or rate of change of pressure within the aircraft cabin. The controller may be configured to command the actuator to modulate the outflow valve in accordance with a predetermined schedule or as a function of one or more operational criteria. For example, the CPCS may additionally include one or more cabin pressure sensors to sense cabin pressure and supply pressure signals representative thereof to the controller. By actively modulating the outflow valve, the controller may maintain aircraft cabin pressure and/or aircraft cabin pressure rate of change within a desired range.

In some aircraft, the outflow valve may be positioned on the aircraft outer skin surface such that, when pressurized air is exhausted from the cabin, the exhausted air may provide additional forward thrust to the aircraft. Thus, outflow valves may sometimes be referred to as thrust recovery valves. Many thrust recovery valves often include two valve doors with multiple actuation linkages to enable proper sealing, reduce drag, and optimize valve door positioning for cruise thrust creation. In order to maximize the thrust produced by two-door thrust recovery valves, the valve doors are shaped and sealed so that air flow is directed between the doors during flight.

In addition to the above, it is noted that most commercial aircraft are required to be designed to withstand highly unlikely, yet postulated events. One of these events is a loss of pressurized air flow into the aircraft cabin during flight. In particular, the ventilation systems in such aircraft are designed, in the unlikely occurrence of a loss of the pressurized air flow, to provide at least 0.4 lb/min of fresh air for each occupant to prevent $CO_2$ poisoning. Therefore, in addition to an outflow valve or thrust recovery outflow valve, most commercial aircraft include one or more emergency ram air inlet valves, actuators, and control electronics. In the unlikely occurrence of a loss of pressurized air flow, these ram air inlet valves may be opened to implement what is referred to herein as a "ram air recovery function," in which ambient air is forced into the aircraft cabin.

The ram air inlet valves, actuators, and control electronics are typically not used, but are provided only for the unlikely occurrence of a loss of pressurized air flow to the cabin. Thus, these components unnecessarily increase aircraft weight and cost for a vast majority of flight conditions. Accordingly, it would desirable to incorporate the functionality of the ram air inlet valves into another, existing aircraft system, such as the CPCS, and more specifically into CPCS thrust recovery outflow valves.

BRIEF SUMMARY

In one embodiment, a thrust recovery outflow valve includes a valve frame, a first valve door, a second valve door, and a flap. The valve frame is configured to be mounted on an aircraft exterior skin, and includes an inner surface that defines opening through the valve frame. The first valve door is rotationally mounted on the valve frame and is rotatable between a first door closed position and a plurality of first door open positions. The second valve door is rotationally mounted on the valve frame and is rotatable, independent of the first valve door, between a second door closed position and a plurality of second door open positions. The flap is rotationally mounted on the first valve door and is rotatable between a stowed position and a deployed position. The flap is disposed adjacent to the first valve door when in the stowed position, and is rotated away from the first valve door and toward the second valve door when in the deployed position. The flap is configured to move from the stowed position to the deployed position when the first valve door is rotated to a first predetermined open position.

In another embodiment, a method for controlling the transfer of air between a cabin in an aircraft and atmosphere outside of the aircraft, for an aircraft that has an outflow valve mounted thereon that includes a valve frame, a first valve door, and a second valve door, the first valve door rotationally mounted in the valve frame and rotatable between a first door closed position and a plurality of first door open positions, the second valve door rotationally mounted in the valve frame and rotatable, independent of the first valve door, between a second door closed position and a plurality of second door open positions. The first valve door is rotated to a first predetermined open position while the second valve door is in the second door closed position to thereby open first and second flow passages that place the aircraft cabin in fluid communication with the atmosphere, where the first flow passage is disposed between the first valve door and the valve frame, the second flow passage disposed between the first valve door and the second valve door. When the first valve door is at the first predetermined open position, a flap is rotated, relative to the first valve door, to at least partially cover the second flow passage and thereby at least inhibit flow through the second flow passage.

Furthermore, other desirable features and characteristics of the thrust recovery outflow valve and method will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Furthermore, there is no intention to be bound by any expressed or implied theory presented in the preceding technical field, background, brief summary, or the following detailed description.

Figure 1:
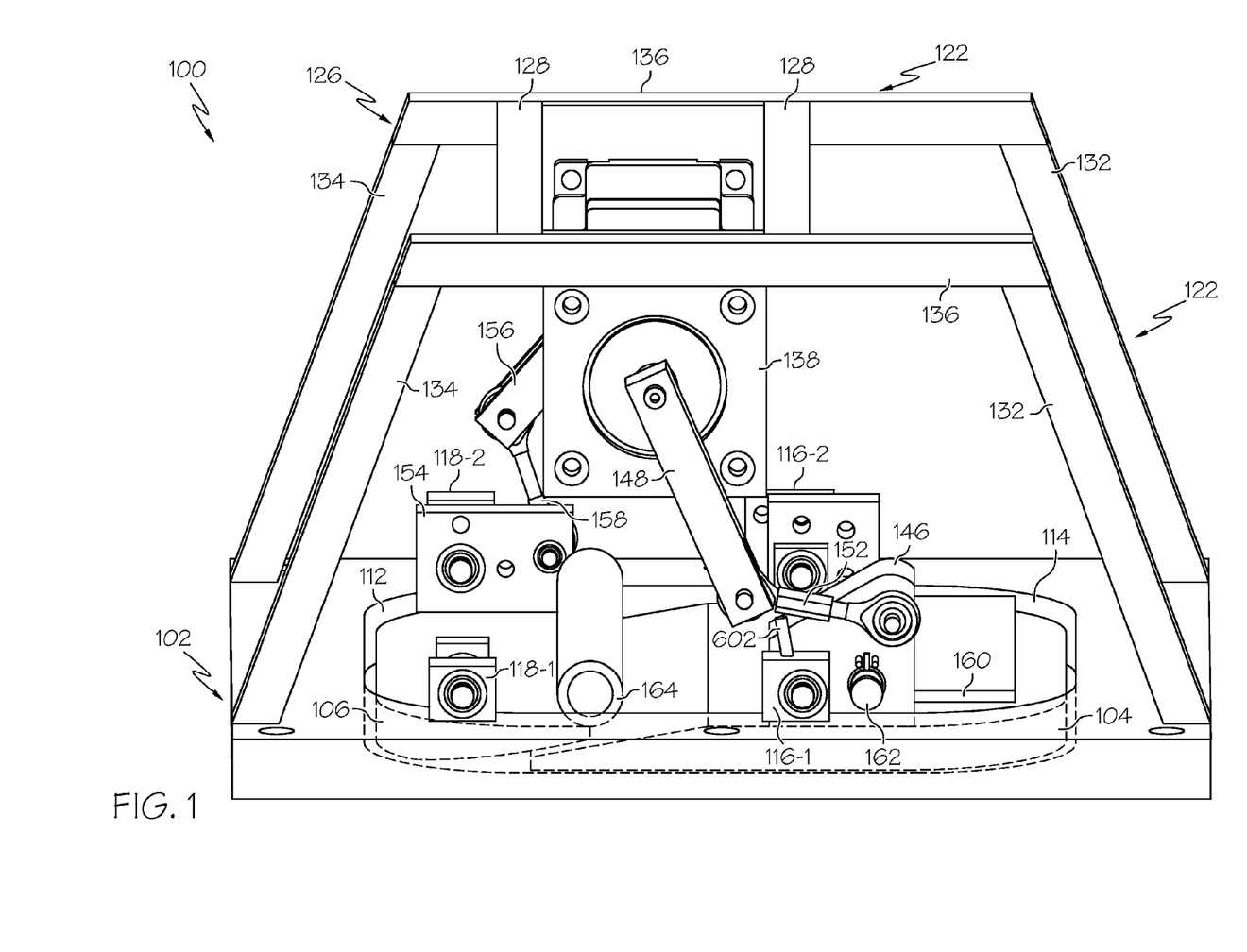
FIGS. 1-5 depict various perspective plan views of an embodiment of a thrust recovery outflow valve in various valve positions.
Figure 2:
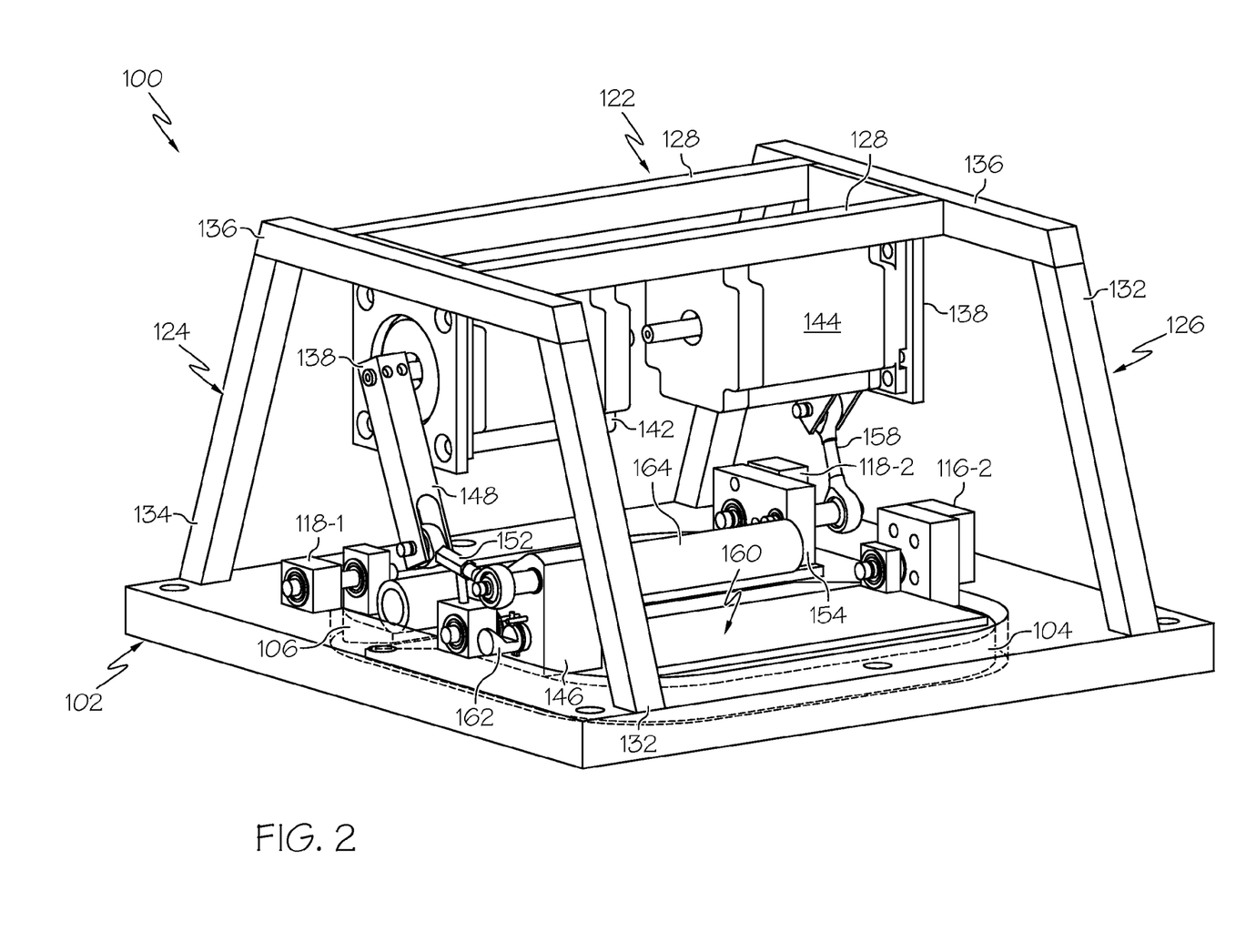

Referring now to FIGS. 1 and 2, perspective plan views of one embodiment of a thrust recovery outflow valve 100 is depicted and includes a valve frame 102, a first valve door 104, and a second valve door 106. The valve frame 102, which, for additional clarity, is partially depicted in transparent manner, is configured to be mounted on an aircraft exterior skin and includes an inner surface 112 that defines opening 114. The valve frame 102, at least in the depicted embodiment, additionally includes a plurality of hinge mounts—a pair of first hinge mounts 116 (e.g., 116-1, 116-2) and a pair of second hinge mounts 118 (e.g., 118-1, 118-1)—and an actuator mount frame 122. The first and second hinge mounts 116, 118, which are used to rotationally mount the first and second valve doors 104, 106, respectively, may be formed integrally with the valve frame 102 or formed separately and coupled thereto.

The actuator mount frame 122, which may also be formed integrally with the valve frame 102 or formed separately and coupled thereto, includes a first side support 124, a second side support 126, and a plurality of cross members 128 (e.g., 128-1, 128-2). The first side support 124 is coupled to one side of the valve frame 102, and the second side support 126 is coupled to an opposing side of the valve frame 102. The first and second side supports 124, 126 are identical polygonal-shaped structures that include a fore arm 132, and aft arm 134, and a top arm 136. The fore and aft arms 132, 134 each extend from the valve frame 102 at a non-perpendicular angle relative to the valve frame 102, and the top arm 136 interconnects the fore and aft arms 132, 134. The cross members 128 are coupled between, and provide lateral support for, the top arms 136 of the first and second side supports 124, 126.

As FIGS. 1 and 2 also depict, the first and second side supports 124, 126 each include an actuator mount plate 138. The actuator mount plates 138 extend perpendicularly from one of the top arms 136, and between the associated fore and aft arms 132, 134. Each actuator mount plate 138 is configured to have an actuator mounted thereon. In particular, a first actuator 142 is mounted on one actuator mount plate 138, and a second actuator 144 is mounted on the other actuator mount plate 138. The first and second actuators 142, 144 are configured to supply a drive force to the first valve door 104 and the second valve door 106, respectively.

Figure 3:
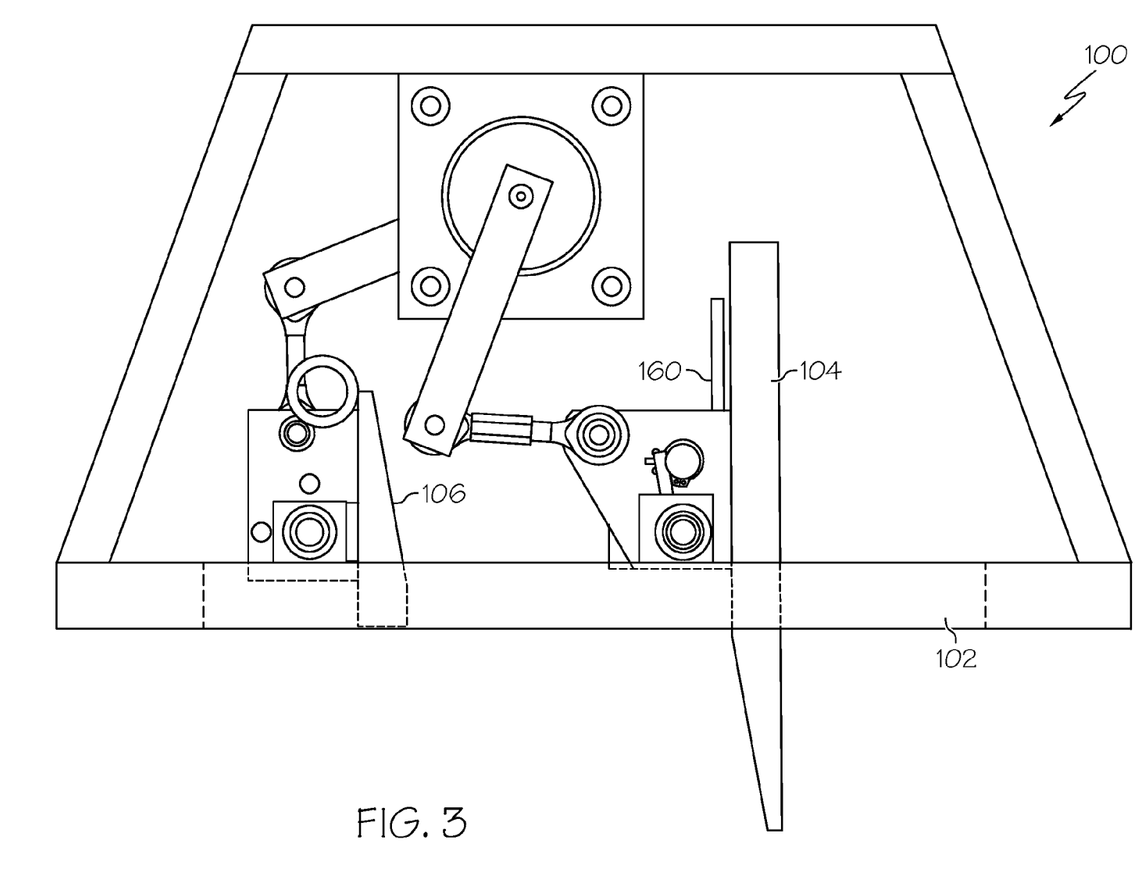
Figure 4:
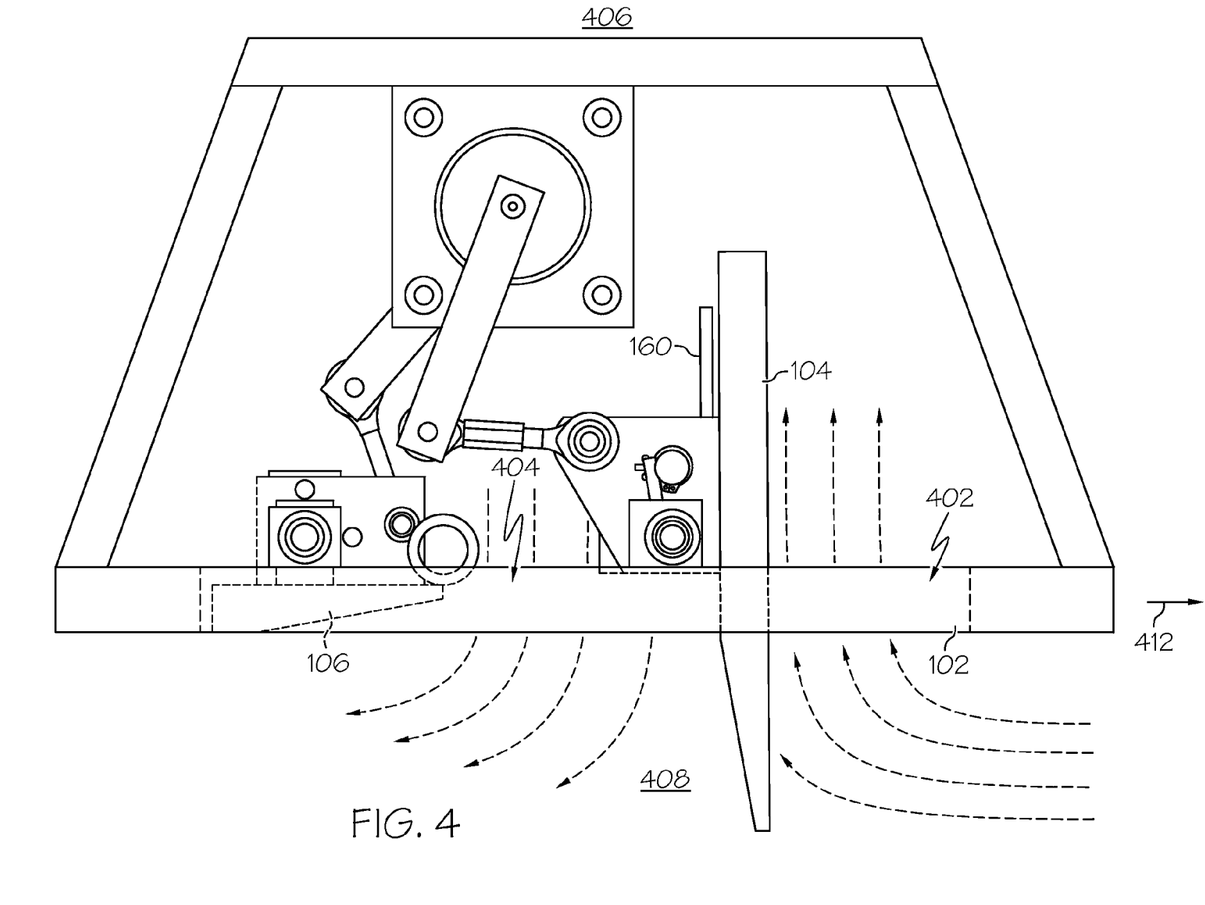
Figure 5:
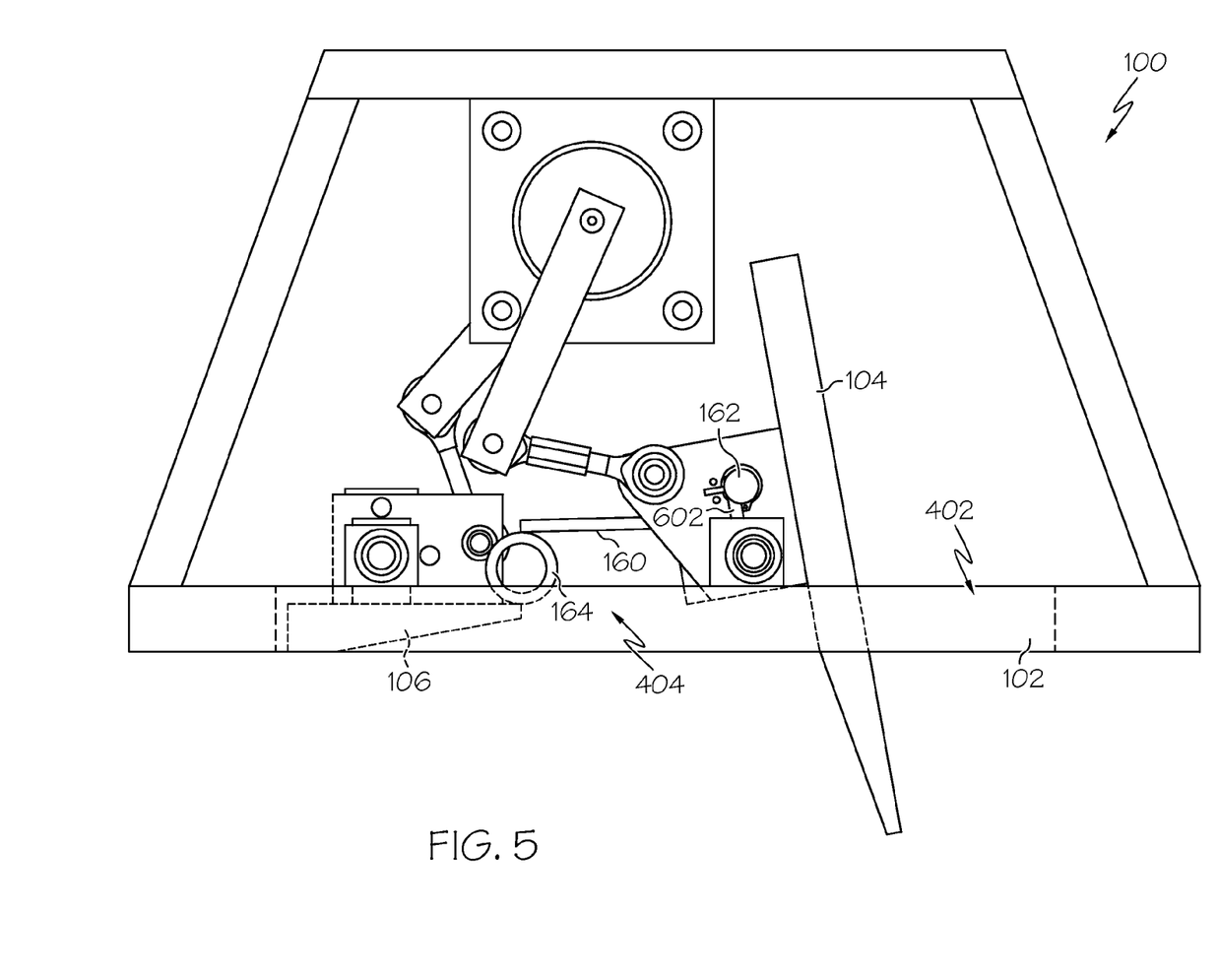

The first valve door 104 and the second valve door 106 are both rotationally mounted on the valve frame 102. The first valve door 104 is rotatable between a first door closed position, which is the position depicted in FIGS. 1 and 2, and a plurality of first door open positions, two of which are depicted in FIGS. 3-5. The second valve door 106 is rotatable, independent of the first valve door 104, between a second door closed position, which is the position depicted in FIGS. 1, 2, 4, and 5, and a plurality of second door open positions, one of which is depicted in FIG. 3. It is noted that the first and second valve doors 104, 106 are both rotatable to an angle of greater than 90-degrees with respect to each of their respective closed positions. As an example of this, FIG. 5 depicts the first valve door rotated to an angle of about 100-degrees with respect to the first valve door closed position.

It will be appreciated that the first and second valve doors 104, 106 may be variously sized and configured. Preferably, however, the first and second valve doors 104, 106 are different sizes. In the depicted embodiment, it is seen that the first valve door 104 is greater in size than the second valve door 106. In part, this is because the second valve door 106 is operated during a majority of aircraft flight conditions, and is thus smaller so that it exhibits relatively low aerodynamic loading, and requires relatively low operating torque and current. Moreover, as FIGS. 1 and 2 depict, at least in the depicted embodiment, the first and second valve doors 104, 106 are configured to at least partially overlap when the first valve door 104 is in the first door closed position and the second valve door 106 is in the second valve door closed position.

The first and second valve doors 104, 106, as noted above, receive a drive force from the first and second actuators 142, 144, respectively. To facilitate this, the first and second valve doors 104, 106 are coupled to the first and second actuators 142, 144 via suitable interconnection structures. In particular, the first valve door 104 is coupled to the first actuator 142 via a first actuator input structure 146, a first drive link 148, and a first coupler link 152. The first actuator input structure 146 is coupled to, and extends from, the first valve door 104, to receive the drive force from the first actuator 142, via the first drive link 148 and first coupler link 152, and transfer the received drive force to the first valve door 104. The first drive link 148 is coupled to the first actuator 142 to receive the drive force therefrom. The first coupler link 152 is coupled between the first drive link 148 and the first actuator input structure 146 to transfer the drive force from the first actuator 142 to the first actuator input structure 146.

The second valve door 106, similar to the first valve door 104, is coupled to the second actuator 144 via a second actuator input structure 154, a second drive link 156, and a second coupler link 158. The second actuator input structure 154 is coupled to, and extends from, the second valve door 106, to receive the drive force from the second actuator 144, via the second drive link 156 and second coupler link 158, and transfer the received drive force to the second valve door 106. The second drive link 156 is coupled to the second actuator 144 to receive the drive force therefrom. The second coupler link 158 is coupled between the second drive link 156 and the second actuator input structure 154 to transfer the drive force from the second actuator 144 to the second actuator input structure 154.

In addition to the first and second valve doors 104, 106, the thrust recovery outflow valve 100 includes a flap 160. The flap 160 is rotationally mounted on the first valve door 104. Although various techniques and configurations may be used to rotationally mount the flap 160, in the depicted embodiment, the flap 160 is rotationally coupled to, and is thus selectively rotatable relative to, the first actuator input structure 146. More specifically, the flap 160 is rotatable between a stowed position and a deployed position. In the stowed position, which is the position depicted in FIGS. 1-4, the flap 160 is disposed adjacent to the first valve door 104. In the deployed position, which is the position depicted in FIG. 5, the flap 160 is rotated away from the first valve door 104 and toward the second valve door 106. The reason for this will be explained further below.

The flap 160 is configured to move from the stowed position to the deployed position when the first valve door 106 is rotated to a first predetermined open position. The flap 160 is additionally configured to move from the deployed position back to the stowed position when the first valve door 104 is rotated back to a second predetermined open position that is closer to the first door closed position than the first predetermined open position. It will be appreciated that the first predetermined open position and the second predetermined open position may vary. In the depicted embodiment, however, the first predetermined open position is the position depicted in FIG. 5; that is, an angle of about 100-degrees with respect to the first valve door closed position. And the second predetermined open position, at least in the depicted embodiment, is an angle of about 90 to 95-degrees. It is noted that the first predetermined open position and the relative sizes of the first and second doors 104, 106 may be uniquely determined for each aircraft using analysis and testing.

Figure 6:
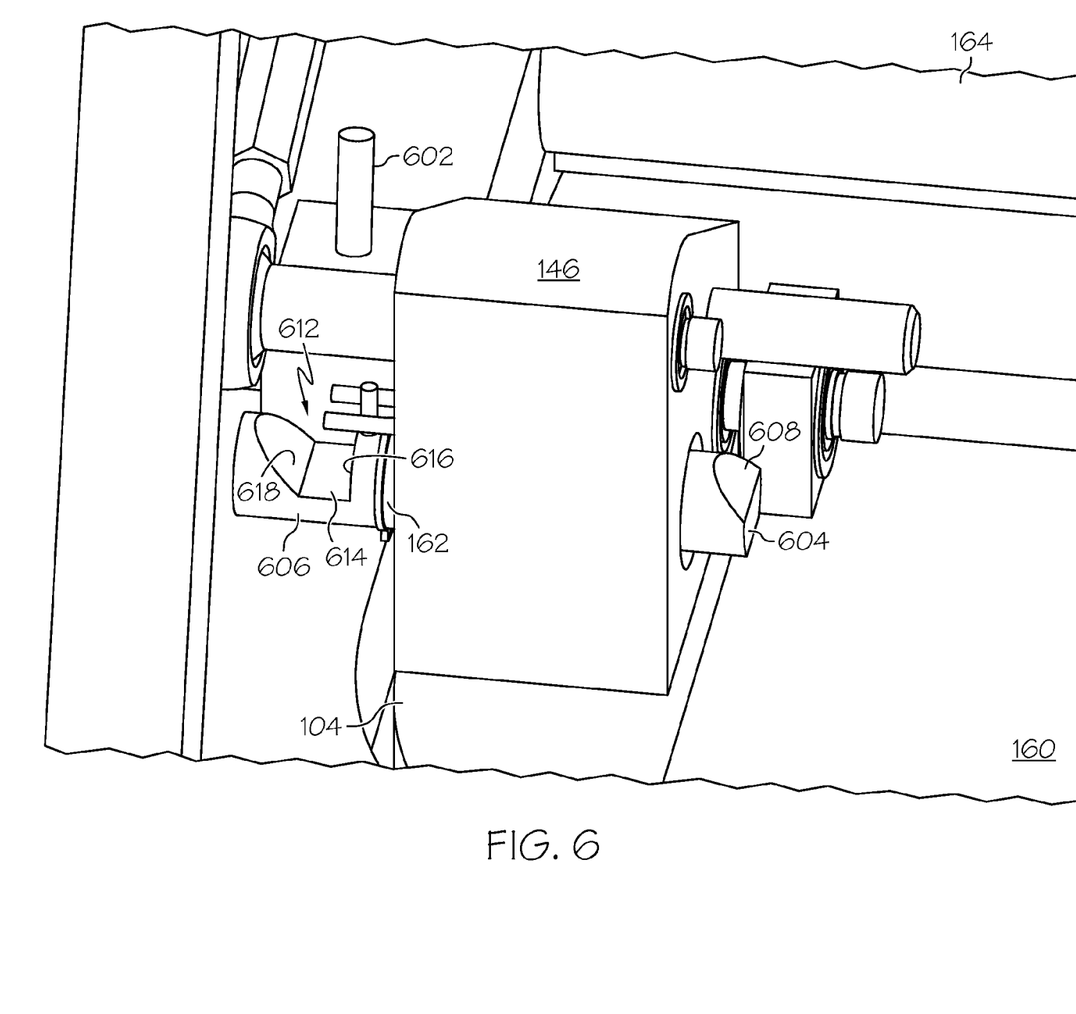
FIGS. 6-11 are close-up perspective views of various portions of the thrust recovery outflow valve depicted in FIGS. 1-5.
Figure 7:
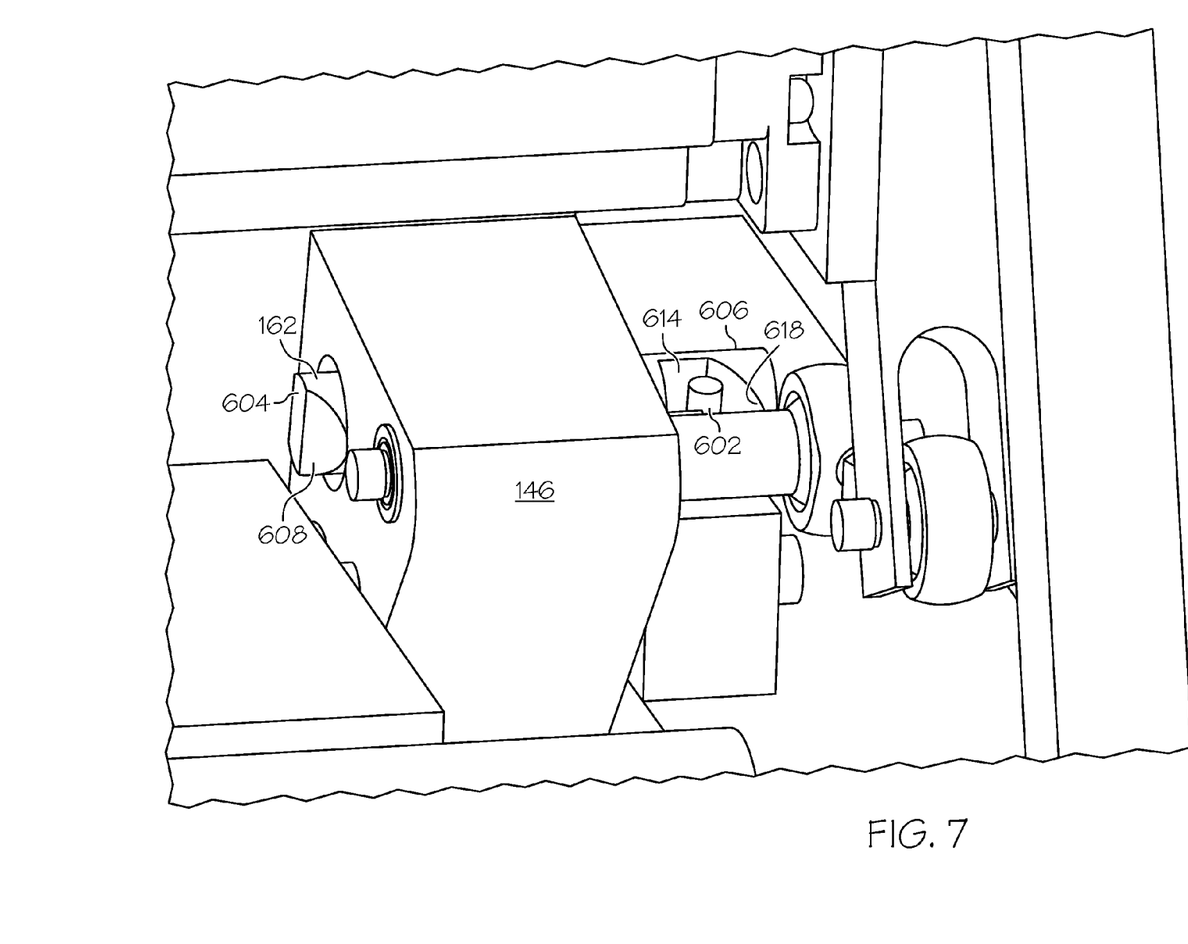

The flap 160 may be selectively moved between the stowed and deployed positions using any one of numerous means and techniques. In the depicted embodiment, however, the flap 160 is retained in the stowed position via a flap engagement pin 162. As shown most clearly in FIGS. 6 and 7, the flap engagement pin 162 extends through the first actuator input structure 146. The flap engagement pin 162 is configured to be selectively movable between a hold position and a release position. In the hold position, which is the position depicted in FIG. 6, the flap engagement pin 162 will, when the flap 160 is already in the stowed position, hold the flap 160 in the stowed position. In the release position, which is the position depicted in FIG. 7, the flap engagement pin 162 will not hold the flap 160 in the stowed position, and thus allow the flap 160 to freely rotate.

It is noted that the flap engagement pin 162 is spring-loaded toward the hold position. Thus, as FIG. 6 also depicts, the thrust recovery outflow valve 100 includes an actuation pin 602 to move the flap engagement pin 162 from the hold position to the release position. More specifically, the actuation pin 602, which is coupled to the valve frame 102, is configured to move the flap engagement pin 162 from the hold position to the release position when the first valve door 104 is rotated to the first predetermined open position. To facilitate this, the flap engagement pin 162 includes a flap engagement end 604 and an actuator engagement end 606. The flap engagement end 604 extends inwardly from the first actuator input structure 146 and, as its moniker connotes, selectively engages the flap 160. A portion of the flap engagement end 604 is chamfered 608 to facilitate movement of the flap 160 back to the stowed position after it has been released therefrom.

Figure 8:
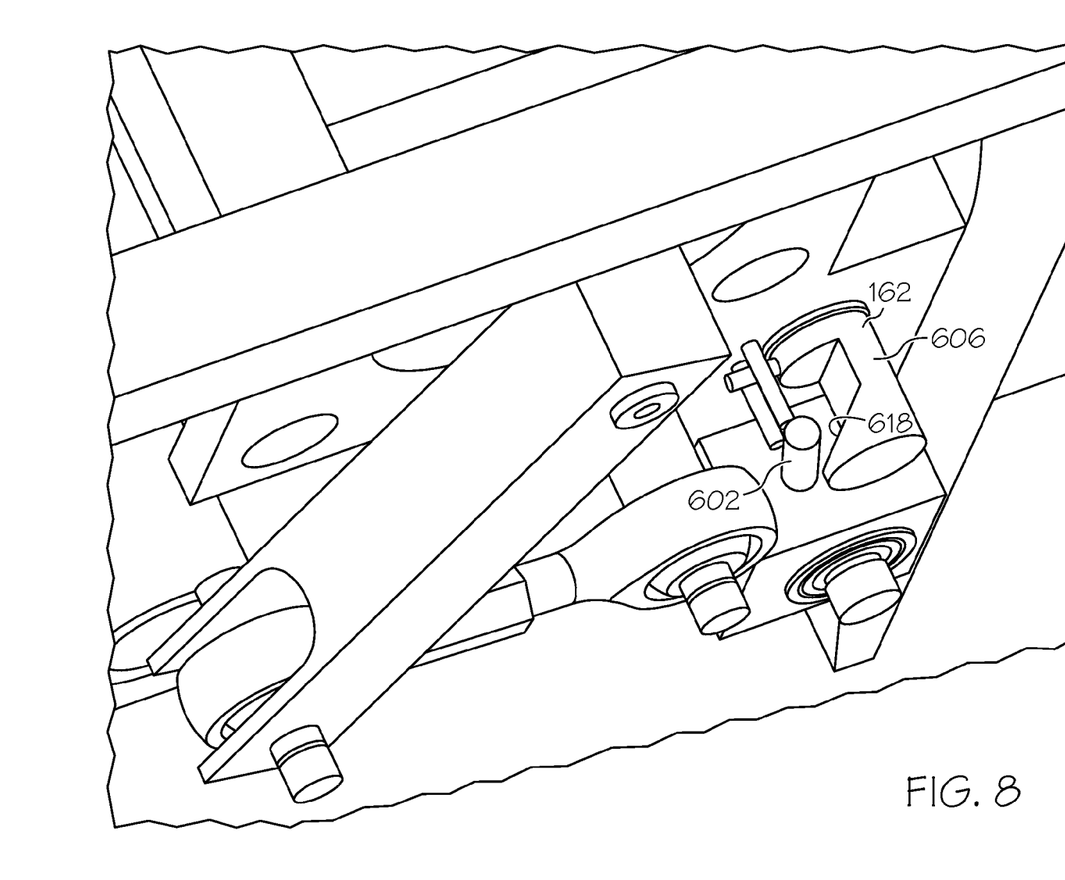
Figure 9:
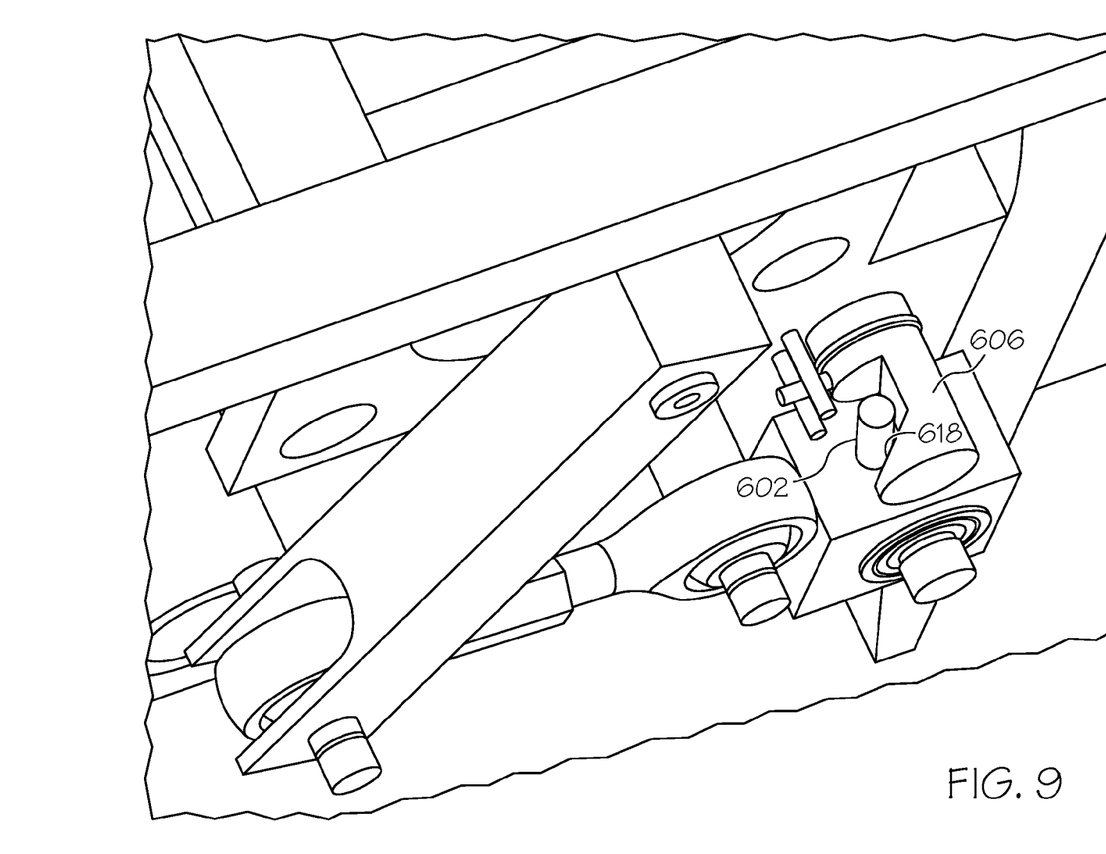

The actuator engagement end 606 of the flap engagement pin 162 extends outwardly away from the first actuator input structure 146 and, as its moniker also connotes, selectively engages the actuation pin 602. The actuator engagement end 606 has a groove 612 formed therein, that has a bottom surface 614, an inner side surface 616, and an outer side surface 618. The outer side surface 618 is angled inwardly, and selectively engages the actuation pin 602. More specifically, as is depicted in FIGS. 8 and 9, when the first valve door 104 is rotated toward the first predetermined open position, the actuator engagement end 606 engages the actuation pin 602. As the first valve door 104 continues to rotate to the first predetermined open position, the actuation pin 602, due to the angled configuration of the outer side surface 618, moves the flap engagement pin 162 to the release position.

Figure 10:
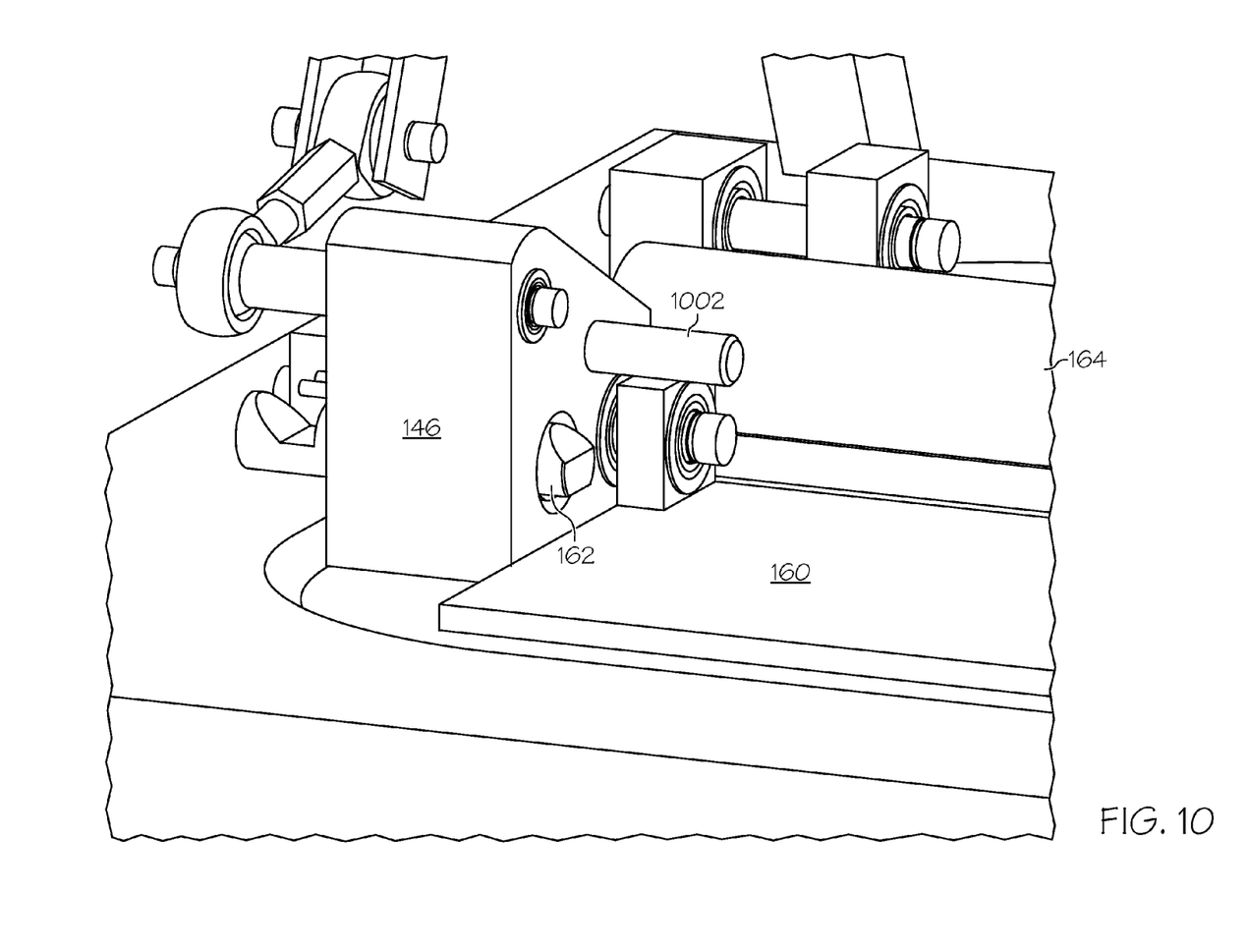

When the flap engagement pin 162 is moved to the release position, the flap 160 is allowed to freely rotate. As a result, the flap 160 will rotate away from the first valve door 104 and toward the second valve door 106. Depending upon the positions of the first and second valve doors 104, 106, the flap 160 will continue to rotate until it hits a stop pin 1002 (see FIG. 10) that is coupled to and extends from the first actuator input structure 146, or until it hits a flap stop structure 164 (see FIGS. 1-5 and 10) that is integrally formed on or coupled to the second valve door 106.

Having described the structural configuration of the thrust recovery outflow valve 100, the operation of the thrust recovery outflow valve 100 to implement the ram air recovery function will now be described. Before doing so, it is noted that first door 104 is only rotated out of the first door closed position during low altitude flight operations, ground operations, as a redundant means to relieve positive differential pressure, and for ram air recovery operations. During all other operational modes, the first valve door 104 remains in the first door closed position (FIG. 1), and the position of the second valve door 106 is modulated between the second door closed position and any one of a plurality of open positions. With the exception of the ram air recovery function, the thrust recovery outflow valve 100 is conventionally controlled and operated to implement each of the functions just mentioned. Thus, detailed descriptions of the operation of the thrust recovery outflow valve 100 to implement these functions will not be provided.

To implement the ram air recovery function, the outflow valve 100 is placed in what is referred to herein as "the ram air configuration." In this configuration, the first valve door 104 is moved to the first predetermined open position and the second valve door 106 is moved to the second door closed position. Referring first to FIG. 4, the second valve door 106 is shown in the second door closed position, and the first valve door 104 is shown rotated to a forward door open position in which it is disposed at an angle of about 90-degrees with respect to the first door closed position. In these valve door positions, a first flow passage 402 is opened between the first valve door 104 and the valve frame 102, and a second flow passage 404 is opened between the first valve door 104 and the second valve door 106.

When the thrust recovery outflow valve 100 is installed in an aircraft, and the first valve door 104 is rotated to the depicted 90-degree position (or any other first door open position) and the second valve door 106 is in the second door closed position, the first and second flow passages 402, 404 place the aircraft cabin 406 in fluid communication with the atmosphere 408 outside the aircraft. As FIG. 4 further depicts, when the aircraft is in flight and moving forward 412, ram air (illustrated using dashed arrowhead lines) will desirably enter through the first flow passage 402. However, the second flow passage 404 undesirably allows air to exit the aircraft cabin 406. Referring now to FIG. 5, it is seen that as the first valve door 104 is rotated into the first predetermined open position, the flap engagement pin 162 engages the actuation pin 602, and is moved to the release position. As noted above, this allows the flap 160 to move from the stowed position to the deployed position and, due in part to pressure loading thereon, to significantly cover, or at least partially cover, cover the second flow passage 404, and thereby at least inhibit flow through the second flow passage 404.

Figure 11:
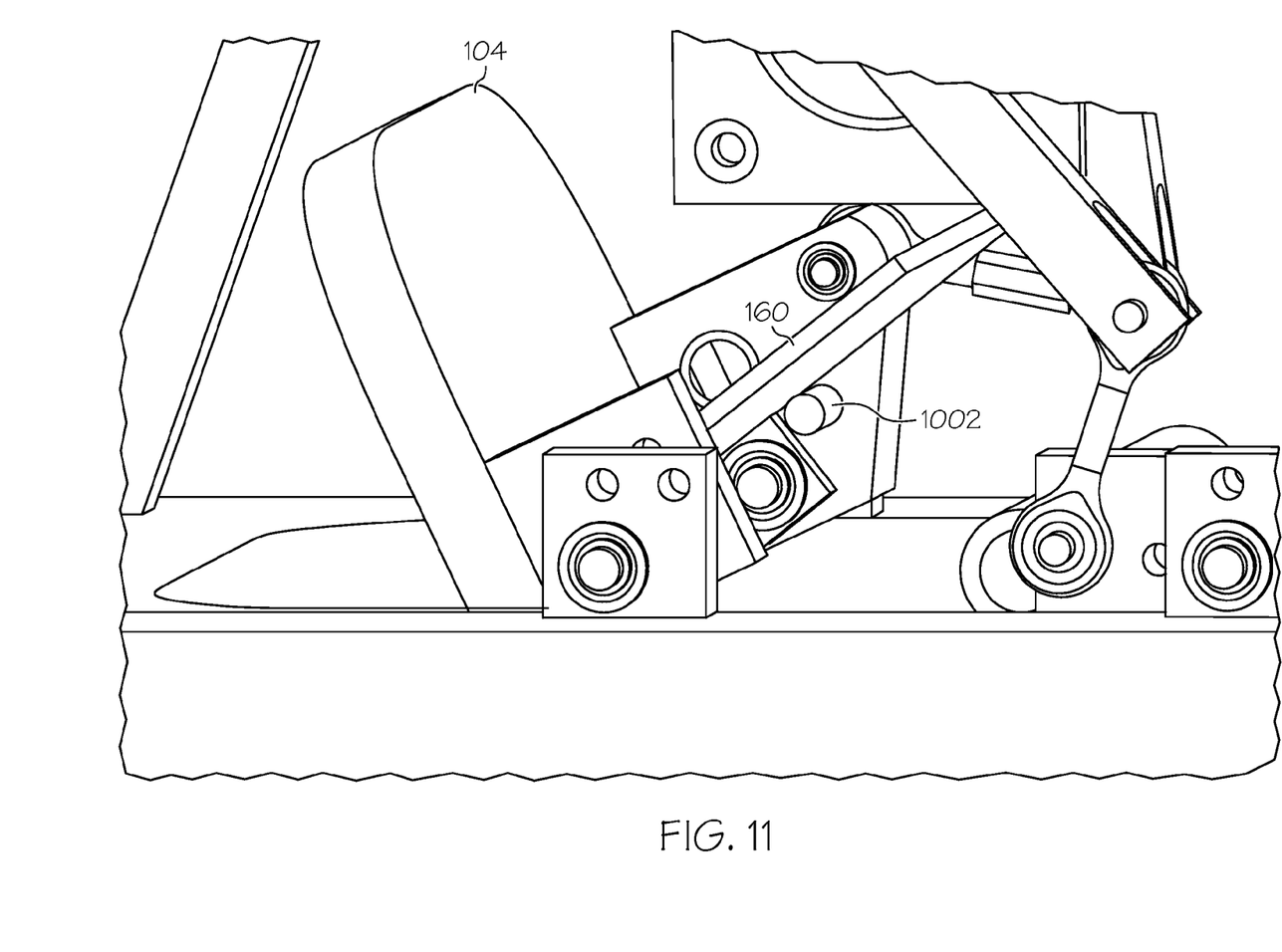

When the ram air recovery function is no longer needed, the forward door 104 may be rotated back toward the forward door closed position. Not long after it begins rotating in that direction, the flap engagement pin 162 will become disengaged from the actuation pin 602, and will move back to the hold position. Moreover, as shown in FIG. 11, at some point during the rotation, the stop pin 1002 will engage the flap 160 to prevent further rotation thereof toward the second valve door 106. As the forward door 104 continues to rotate back toward the closed position, and at a second predetermined open position, pressure loading on the flap 160 will assist in returning it to the stowed position.

Figure 12:
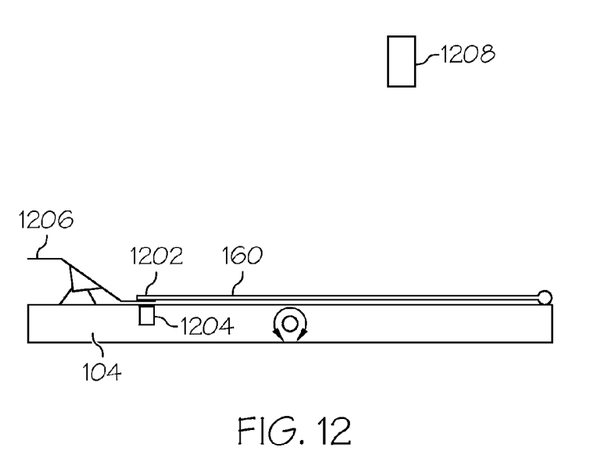
FIGS. 12-14 are simplified views of a portion of the thrust recovery outflow valve depicting an alternative embodiment of a flap release mechanism.

It will be appreciated that the mechanism used to retain and release the flap 160 may vary in configuration and implementation, and the actuation pin 162 and flap engagement pin 602 are merely exemplary of one configuration and implementation. One of numerous other configurations and implementations is depicted in FIGS. 12-14, and with reference thereto will now be described.

The depicted alternative configuration and implementation includes providing the flap 160 with a magnetic material 1202. The magnetic material 1202 may be coupled to, embedded within, or otherwise comprise a portion of, the flap 160. The magnetic material 1202 may be a magnetically permeable material, such as steel or iron, or a permanent magnet. In addition, a magnet 1204 and a release lever 1206 are coupled to the first valve door 104. The magnet 1204, as may be readily appreciated, supplies a magnetic force to attract the magnetic material and retain the flap 160 in the stowed position. The release lever 1206, which is rotationally coupled to the first valve door 104, includes a portion that is disposed between the first valve door 104 and the flap 160 when the flap 160 is in the stowed position.

Figure 13:
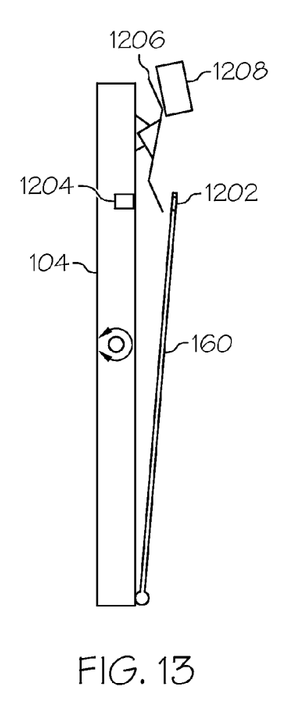
Figure 14:
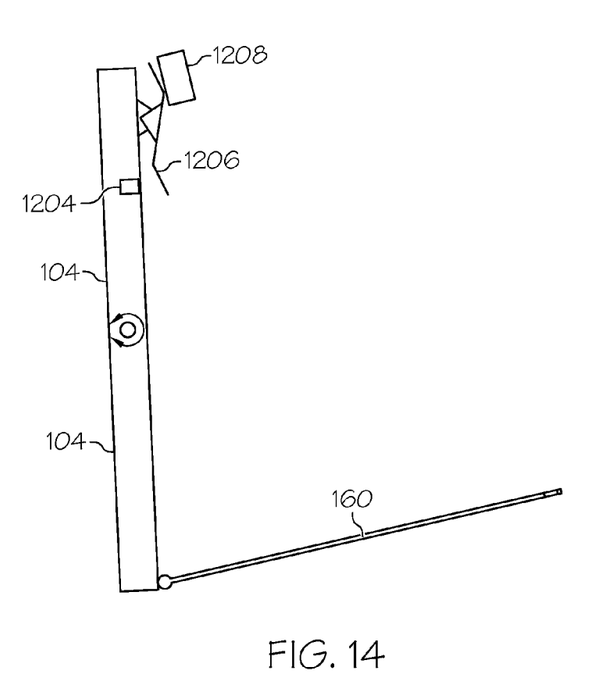

As FIGS. 13 and 14 depict, when the first valve door 104 is rotated to the first predetermined open position, the release lever 1206 engages a fixed structure 1208, which may be, for example, a portion of the actuator mount frame 122. The fixed structure 1208 causes the release lever 1206 to rotate and supply a release force to the flap 160 that overcomes the magnetic force. As a result, the flap 160 rotates from the stowed position to the deployed position. When the forward door 104 is rotated back toward the forward door closed position, pressure loading on the flap 160 will assist in returning it to the stowed position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A thrust recovery outflow valve, comprising:
 a valve frame configured to be mounted on an aircraft exterior skin, the valve frame including an inner surface that defines opening through the valve frame;
 a first valve door rotationally mounted on the valve frame and rotatable between a first door closed position and a plurality of first door open positions;
 a second valve door rotationally mounted on the valve frame, the second valve door rotatable independent of the first valve door, the second valve door rotatable between a second door closed position and a plurality of second door open positions;
 a flap rotationally mounted on only the first valve door, the flap rotatable between a stowed position and a deployed position, the flap disposed adjacent to the first valve door when the flap is in the stowed position, the flap rotated away from the first valve door and toward the second valve door when the flap is in the deployed position, the flap moved from the stowed position to the deployed position when the first valve door is rotated to a first predetermined open position;
 a first actuator input structure coupled to, and extending from, the first valve door, the first actuator input structure adapted to receive a drive force and to transfer the received drive force to the first valve door;
 a stop pin coupled to, and extending from, the first actuator input structure, the stop pin engaged by the flap only when the flap is out of the stowed position;
 a flap engagement pin extending through the first actuator input structure and movable between a hold position, in which the flap engagement pin will hold the flap in the stowed position, and a release position, in which the flap engagement pin will not hold the flap in the stowed position; and
 an actuation pin coupled to the valve frame and configured to engage the flap engagement pin, and thereby move the flap engagement pin from the hold position to the release position, only when the first valve door is rotated to the first predetermined open position.

2. The valve of claim 1, wherein the flap is further configured to move from the deployed position to the stowed position when the first valve door is rotated to a second predetermined open position, the second predetermined open position closer to the first door closed position than is the first predetermined open position.

3. The valve of claim 1, wherein the flap engages one of the stop pin and the second valve door when the flap is in the deployed position.

4. The valve of claim 3, wherein the flap engages the second valve door when the flap is in the deployed position and the second valve door is in the second door closed position.

5. The valve of claim 1, wherein the flap engagement pin is spring-loaded toward the hold position.

6. The valve of claim 1, wherein the flap is rotationally coupled to the first actuator input structure to selectively rotate relative thereto.

7. The valve of claim 1, further comprising:
a first actuator coupled to the first valve door and configured to selectively rotate the first valve door; and
a second actuator coupled to the second valve door and configured to selectively and independently rotate the second valve door.

8. The valve of claim 1, wherein:
the first valve door is rotatable to an angle of greater than 90-degrees with respect to the first door closed position; and
the second valve door is rotatable to an angle of greater than 90-degrees with respect to the first door closed position.

9. The valve of claim 1, wherein the first valve door and the second valve door are different sizes.

10. The valve of claim 9, wherein the first valve door is larger than the second valve door.

11. The valve of claim 1, wherein the first and second valve doors overlap when the first valve door is in the first door closed position and the second valve door is in the second valve door closed position.

12. The valve of claim 1, wherein:
first and second flow passages are opened through the valve frame when the first valve door is rotated to a first door open position and the second valve door is in the second door closed position;
the first flow passage is disposed between the first valve door and the valve frame;
the second flow passage is disposed between the first valve door and the second valve door.

13. The valve of claim 12, wherein the flap covers at least a portion of the second flow passage when the first valve door is rotated to the first predetermined open position, to thereby at least inhibit flow through the second flow passage.

* * * * *